June 25, 1929.  O. DOBBELSTEIN  1,718,542
APPARATUS FOR DRYING, CHARRING, AND OTHERWISE TREATING LOOSE MATERIAL
Filed Dec. 12, 1924   6 Sheets-Sheet 1
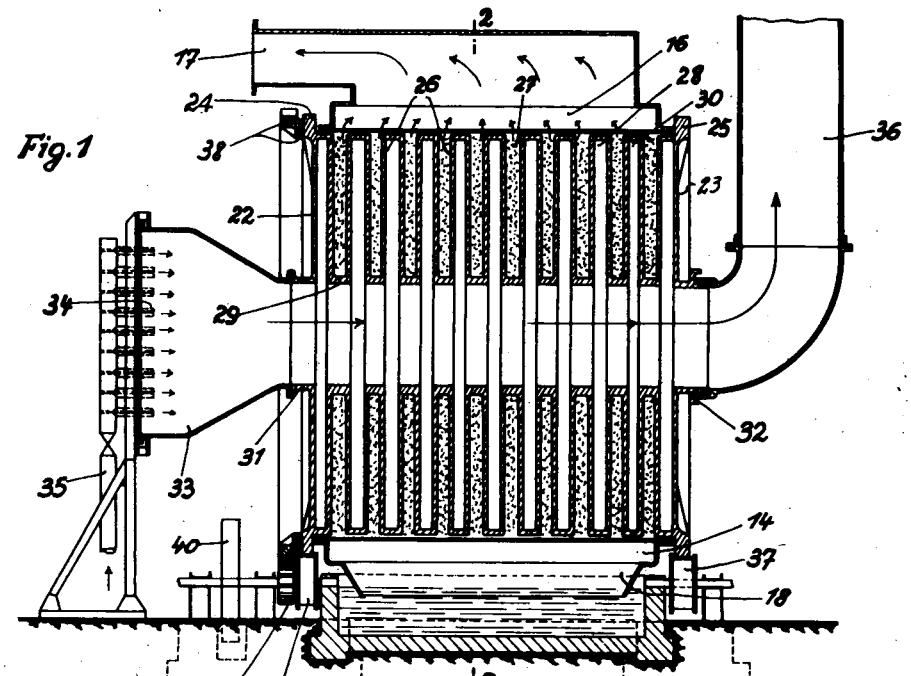
Fig.1
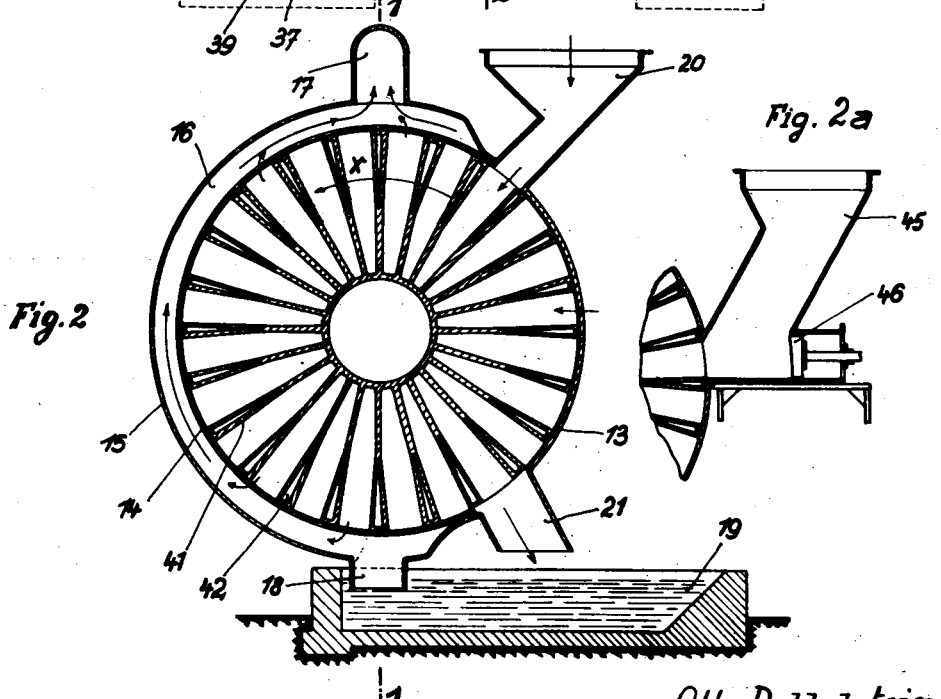
Fig.2
Fig.2a
Otto Dobbelstein
by C. P. Goepel
Attorney.

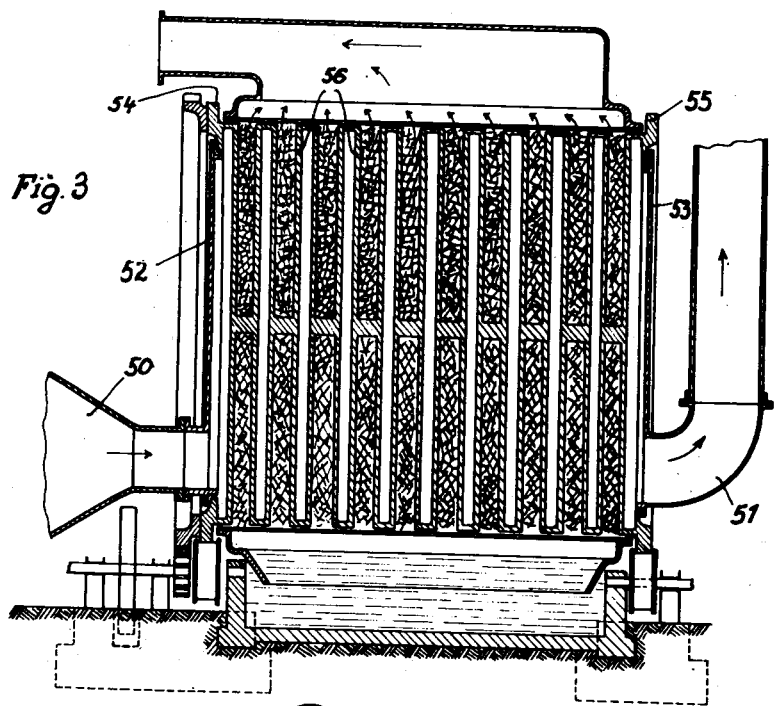
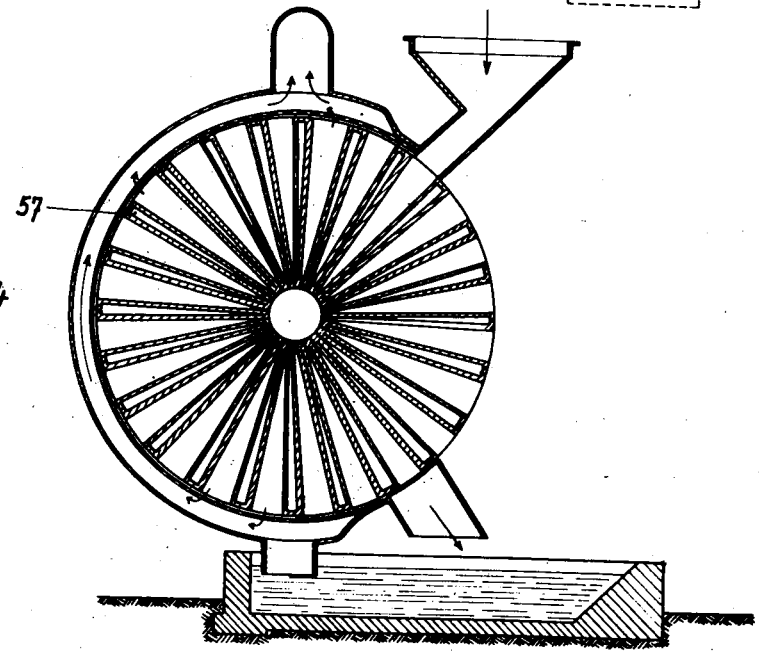

June 25, 1929.   O. DOBBELSTEIN   1,718,542
APPARATUS FOR DRYING, CHARRING, AND OTHERWISE TREATING LOOSE MATERIAL
Filed Dec. 12, 1924   6 Sheets-Sheet 4

Otto Dobbelstein
by C. P. Goepel
Attorney.

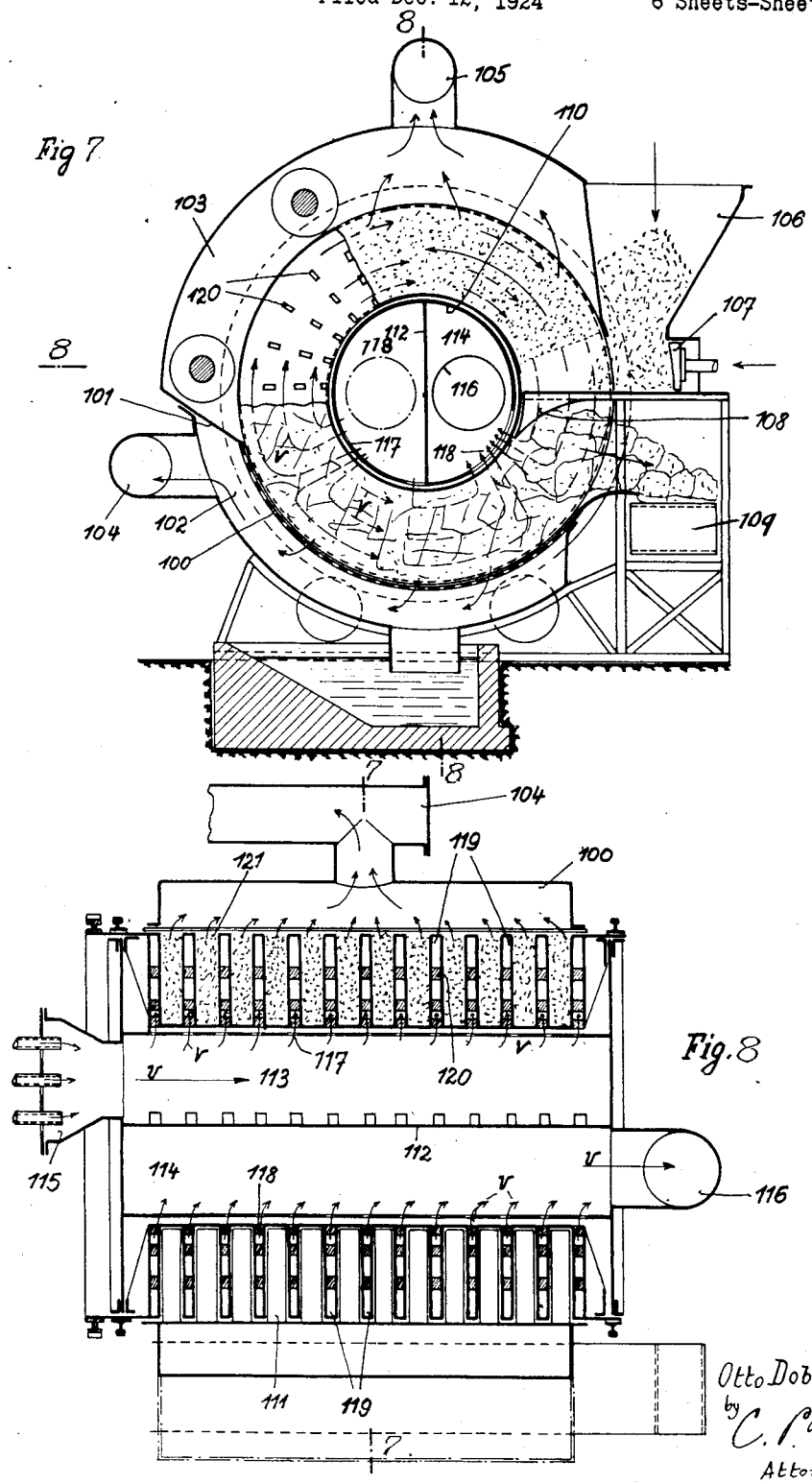

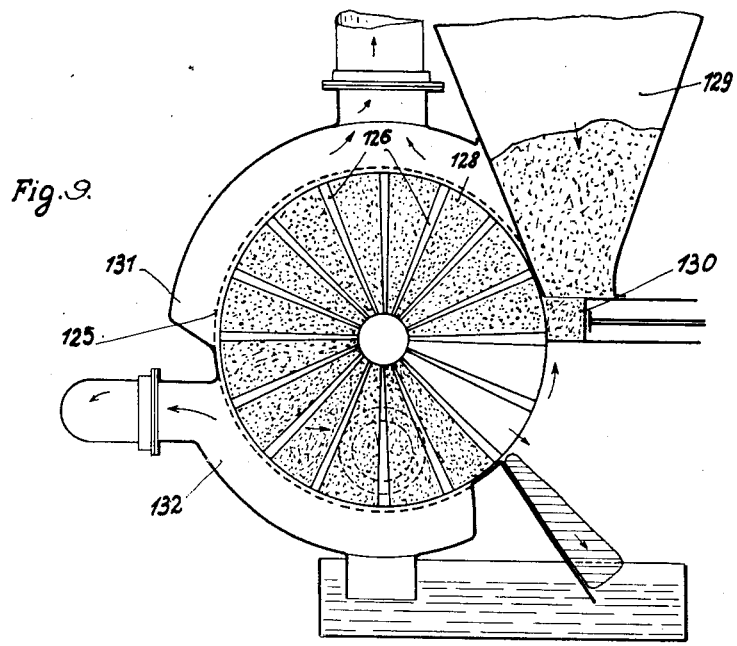
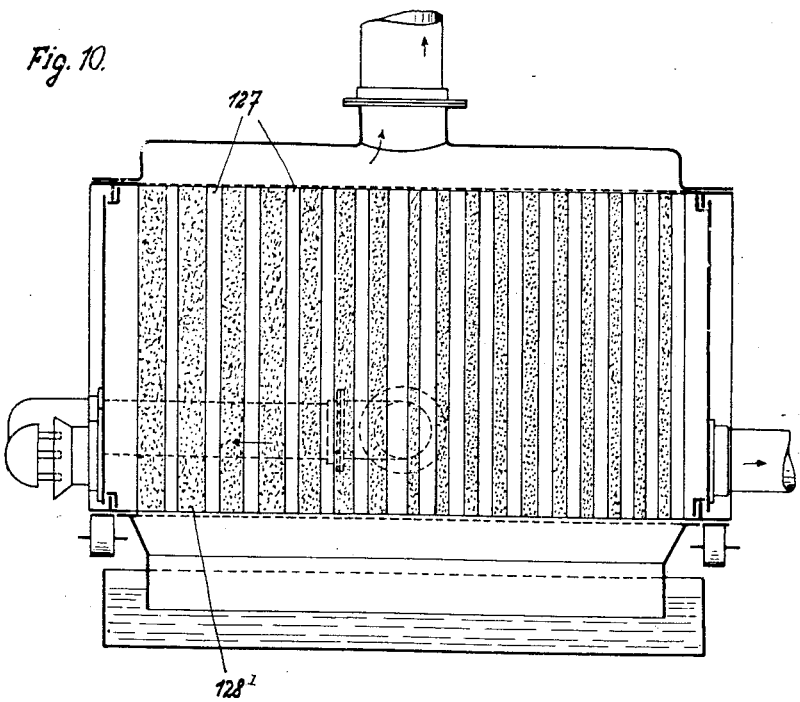

Patented June 25, 1929.

1,718,542

UNITED STATES PATENT OFFICE.

OTTO DOBBELSTEIN, OF ESSEN-ON-THE-RUHR, GERMANY; KAROLINE DOBBELSTEIN EXECUTRIX OF SAID OTTO DOBBELSTEIN, DECEASED.

APPARATUS FOR DRYING, CHARRING, AND OTHERWISE TREATING LOOSE MATERIAL.

Application filed December 12, 1924, Serial No. 755,373, and in Germany December 18, 1923.

My invention relates to improvements in apparatus for drying, charring and otherwise treating loose material such as ore, coal, bituminous slate, argile, and the like, and the object of the improvements is to provide an apparatus by means of which a large mass of material may be uniformly and rapidly heated. Another object is to provide an apparatus which does not give rise to dust when being operated, and in which the parts are readily accessible. With these objects in view my improved apparatus consists of a rotary drum composed of a plurality of narrow chambers disposed transversely of the axis of the drum, one part of the said chambers being designed to receive the loose material and the other one to be traversed by a suitable heating medium. In addition means are provided for charging the chambers with the loose material while the drum is slowly rotated. In some cases the chambers receiving the loose material are divided by radial partitions into segmental chambers.

The number and the dimensions of the said chambers, the character of the heating medium, the temperature, the velocity of the rotation of the drum, and the time of the operation may be different, according to the character of the material and the result aimed at.

Figure 3A:
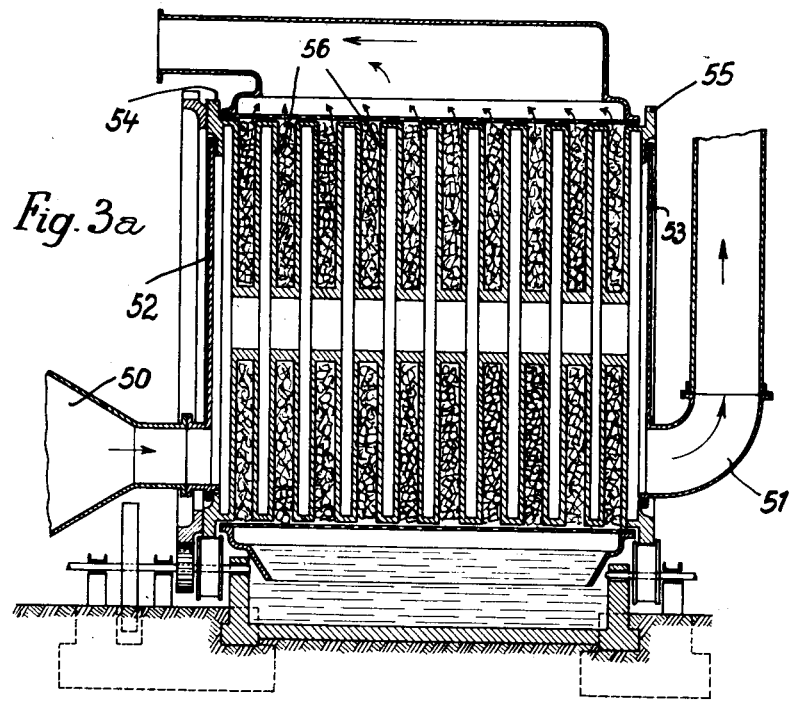
Figure 4A:
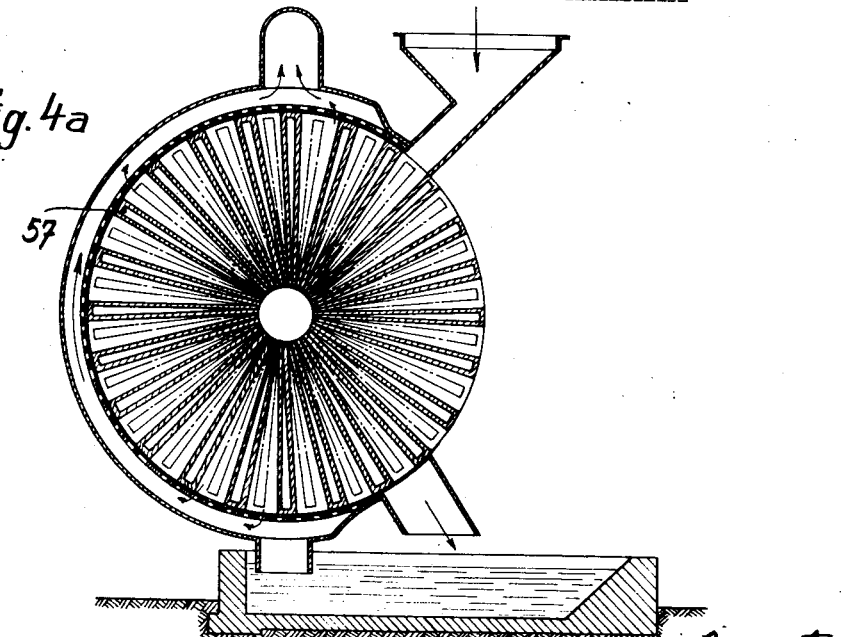
Figure 5:
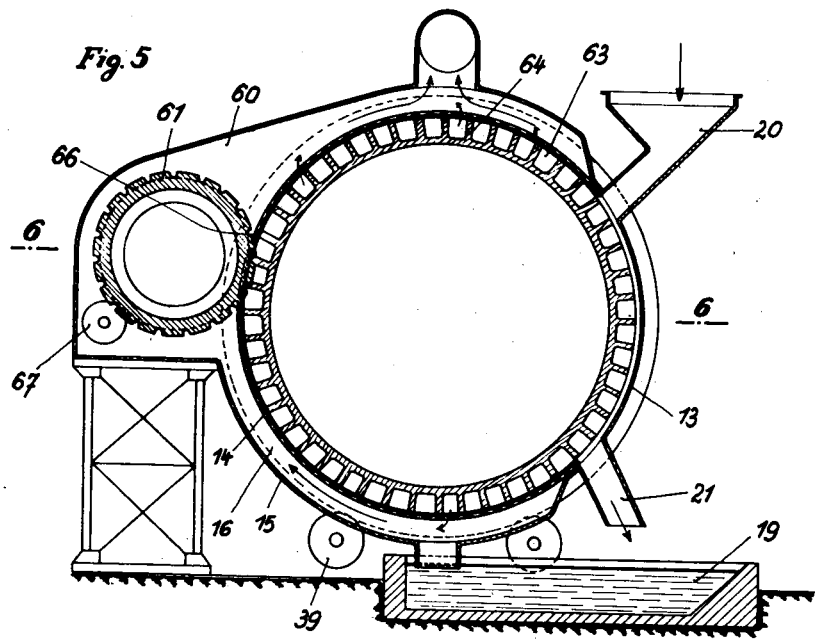
Figure 6:
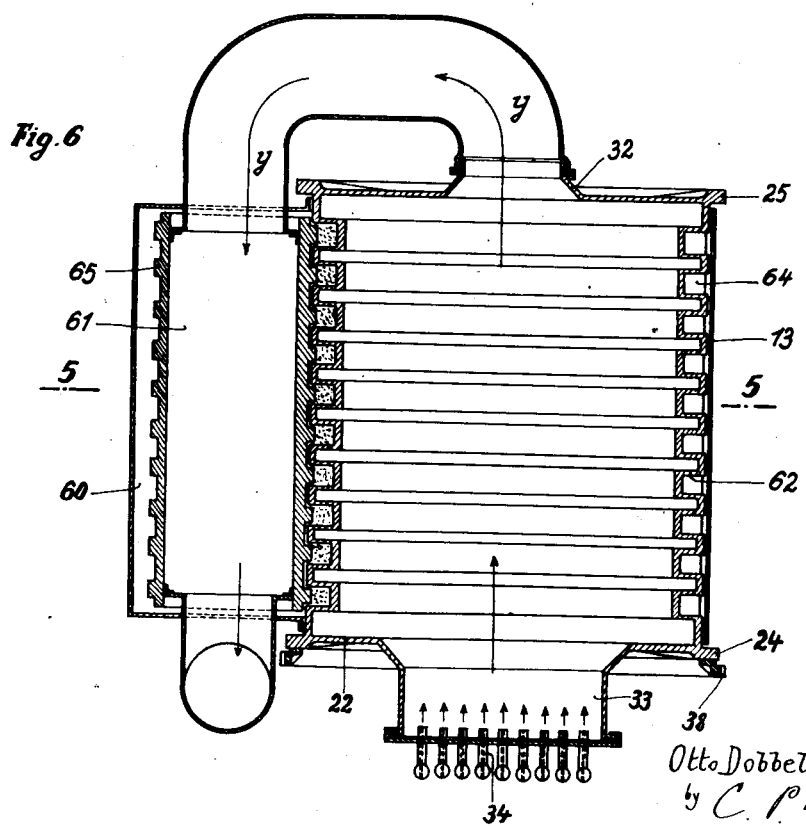

For the purpose of explaining the invention several examples embodying the same have been shown in the accompanying drawings in which the same reference characters have been used in all the views to indicate corresponding parts. In said drawings, Fig. 1, is a sectional elevation taken on the line 1—1 of Fig. 2 and showing the drum, Fig. 2, is a section taken on the line 2—2 of Fig. 1, Fig. 2ª, is a detail sectional view showing a modification of the charging apparatus, Fig. 3 is a sectional elevation showing one modification, Fig. 3ª is a sectional elevation similar to Fig. 3, showing a further modification, Fig. 4 is a cross section of a construction similar to that of Fig. 2, Fig. 4ª is a cross section of another construction similar to that of Fig. 4, Fig. 5, is a sectional elevation taken on the line 5—5 of Fig. 6 and showing another modification, Fig. 6, is a section taken on the line 6—6 of Fig. 5, Fig. 7, is a sectional elevation taken on the line 7—7 of Fig. 8, and showing another modification, Fig. 8, is a section taken on the line 8—8 of Fig. 7, Fig. 9 is a cross sectional elevation of another modification similar to those shown in the Figures 2 and 4, Fig. 10 is a longitudinal section of another modification.

In the example shown in Figs. 1 and 2, my improved apparatus comprises a cylindrical casing having its wall composed of a segmental solid portion 13 and a segmental foraminated section 14. The foraminated portion 14 is provided with a jacket 15 made integral with the solid section 13 and providing an annular passage 16, which passage communicates at its top with a delivery passage 17 and opens at its bottom through a tubular portion 18 into a pool 19 which in some cases contains water. The section 13 is provided with a charging passage or chute 20 and with a tubular delivery member 21 opening above the pool 19.

Within the cylindrical casing 13, 14 there is a rotary drum composed of end walls 22 and 23 formed with flanges 24 and 25, transverse annular walls 26 providing narrow chambers 27 and 28 and alternately connected at their inner and outer circumferences by annular walls 29 and 30, and axial tubular portions 31 and 32 made integral with the end walls 22 and 23 and in alignment with the walls 29 and forming an axial flue communicating with the annular chambers 28. To the member 31 an outwardly flaring tubular member 33 is secured which is provided at its inlet end with a plurality of burners 34 having a supply of a suitable fuel through a pipe 35. The member 32 communicates through a passage 36 with a stack.

The flanges 24 and 25 are supported each on two or more rollers 37, and to the flange 24 a toothed ring 38 is secured which is in mesh with a pinion 39 adapted to be rotated from a suitable source of power represented in a diagrammatical way by a pulley 40.

Preferably the chambers 27 are divided by radial partitions 41 into sectional chambers, and the said partitions are provided with axially extending passages 42 connecting adjacent chambers 28.

In the operation of the apparatus the drum is slowly rotated in the direction of the arrow $x$ shown in Fig. 2, and the chambers 27 are successively charged with the material to be heated through the funnel 20. A suitable heating medium is axially passed through the drum, which heating medium has access to the transverse chambers 28 thus energetically heating the matter confined within the chambers 27. The gas or vapor from the said matter escapes through the foraminated wall 14 and the passages 16 and 17 to a place of further use. As the drum rotates the chambers containing the fuel are gradually moved from the funnel 20 to the delivery passage 21 from which they are discharged into the pool 19, the velocity of the rotation being regulated so that the treating of the material is completed when it arrives at the delivery passage 21.

In the example shown in Figs. 1 and 2 the drum is heated by means of fuel delivered through the burners 34. But I wish it to be understood that my invention is not limited to this feature, and that in some cases waste gas or other heating media are preferred.

In Fig. 2$^a$ I have shown modified means for charging the chambers 27. As shown said means comprise a chute 45 and a reciprocating plunger 46 adapted to force measured amounts of matter into the sections of the chambers 27 and to compress the same within the said chambers, the velocity of rotation of the drum being so small that the plunger may be operated without interrupting the movement of the drum.

In the modification shown in Figs. 3 and 4 the construction of the casing and the drum is similar to the one described with reference to Figs. 1 and 2. However, the construction of the chambers for the matter to be treated and the passage for the heating gas is different. As shown the inlet 50 to the drum and the outlet 51 are disposed eccentrically of the end walls 52 and 53 of the drum, and the said end walls are stationary and in loose engagement with the flanges 54 and 55 of the rotary drum. The transverse partition walls 56 are circular in form, so that there is no axial flue for the heating gas, but the gas flows in axial direction through the passages 57. Preferably the said passages are displaced with relation to one another in the successive chambers, in order to insure good transmission of heat by deflecting the gas.

Figs. 3$^a$ and 4$^a$ show a further modification, constructed to provide the passages 57 above mentioned, but with the drum having an axial flue in it to communicate with the inlet 50 and outlet 51. The casing of Figs. 4 and 4$^a$ may extend around a part only of the drum instead of entirely enveloping it, as shown in Figs. 1 and 2.

In Figs. 5 and 6 I have shown a modification which is particularly designed for forming the matter to be heated, such as coal, into bricks. As shown the apparatus comprises a casing 13, 14, 15 which is similar in construction to the casing described with reference to Figs. 1 and 2, which, however, is provided with a subsidiary chamber 60 communicating with the passage 16 and enclosing a rotary pressure roller or drum 61. The inner diameter of the annular partitions 62 is comparatively large, so that the radial dimension of the chambers is small, which chambers are divided into sectional chambers 63 by partitions 64. Otherwise the construction of the drum and the heating means is the same as that of the corresponding parts shown in Figs. 1 and 2 and the same reference characters have been used to indicate corresponding parts.

The rotary drum 61 is formed with lugs 65 adapted for engagement, through an open part 66 of the foraminated wall 14, with the chambers 63 for compressing the loose material, such as coal, in order to form the same into bricks of coke. Preferably the drum 61 is heated, and as shown the heating gas delivered from the drum 13, 14 is passed through the drum, as is indicated by the arrows $y$. The drum 61 is supported on a pair of coaxial rollers 67, and it is pressed against the material filled into the chamber 63 by gravity. It will be understood that I do not limit myself to the use of a single roller or drum 61.

In the modification shown in Figs. 7 and 8 the casing comprises a foraminated cylindrical wall 100, a circumferential passage divided by a partition 101 into two sections 102 and 103 communicating respectively with discharge pipes 104 and 105, a funnel 106 and a charging plunger 107, and scrapers 108 located below the funnel 106 and adapted to deliver the material to suitable conveying means shown in a diagrammatical way at 109.

The heating medium is supplied through a pipe 110 disposed axially within the drum 111, and it is divided by a vertical partition 112 into two sectional flues 113 and 114 communicating respectively with tubular members 115 and 116 for the intake and delivery of the heating gas. The pipe 110 is provided with two series of apertures 117 and 118 made respectively in the left and right hand sections of the wall of the pipe 110 and adapted to establish communication respectively between the sectional flues 113 and 114 and the parts of the chambers 119 of the rotary drum moving through the left and right hand parts of the casing 100. Therefore, the heating gas flows from the sectional flue 113 through the apertures 117 into the chambers 119, where it is divided into two branches flowing in opposite directions through the chambers 119 and towards the apertures 118 and through the same into the sectional flue 114, from whence it is delivered to the pipe 116, the flow of the gas being indicated by arrows $v$. As appears from Fig. 7, the apertures 117 and 118 are not necessarily made at diametrically opposite parts of the wall of the pipe 110. By disposing the same close to each other I am enabled to cause the major part of the gas to flow through one part of the chambers 119 in order to have an increased heating effect. In the construction shown in the figures the main part of the gas flows through the bottom part of the chambers 119. Preferably baffle members 120 are provided within the chambers 119 for properly distributing the gas within the said chambers. Further, the apertures 117 and 118 may be made with different areas. The matter to be heated is filled into the circumferential chambers 121.

The modification shown in Figure 9 may be said to be a combination of certain features in the constructions shown in Figures 4 and 7, and in similar way the Figure 10 may be said to be a combination of certain features in the constructions shown in the Figures 3 and 8, in so far as the heating gas flows longitudinally of the drum 125 through passages 126, the material is charged into the chambers 128 from a funnel 129 by means of a plunger 130, and the gas or vapor from the heated charge is separately removed through sectional passages 131 and 132. So far the construction is similar to what has been described in the said figures, and it will be readily understood from the drawing without further description. The chambers $128^1$ in Figure 10 are not of even breadth throughout the length of the drum, and if they are gradually reduced in breadth from the intake of the heating gas to the discharge thereof, then there may be obtained a uniform heating effect though the heating gas is gradually cooled by giving off its heat to the material. Further, Fig. 10 shows that when properly disposing the discharge for the heated or charred material some of the chambers 128 are empty, and that therefore one half of the drum is completely filled, while the other half is only partly filled. Therefore, the drum is self-operative, and it is automatically rotated and may even be used for rotating other apparatus.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. An apparatus of the class described, comprising a rotary drum containing inside transverse partitions fixed to the drum and movable therewith so that the drum is thus divided into circumferential chambers alternately designed to be charged with the matter to be heated and to be traversed by a heating medium, means to circulate a heating medium through said chambers for the heating medium, said chambers for the matter to be heated being adapted to receive and deliver the charge at different parts of the circumference of the apparatus, the chambers for the matter to be heated being open at the circumference of the drum and the chambers for the heating medium open adjacent the axis thereof, and means for supporting the drum so that, during each revolution thereof, the contents of each of the chambers for the matter to be heated will be carried from a relatively high point to a relatively low point.

2. An apparatus of the class described, comprising a rotary drum divided into circumferential chambers alternately designed to be charged with the matter to be heated and to be traversed by a heating medium, and means to circulate a heating medium through said chambers for the heating medium, said chambers for the matter to be heated being circumferentially divided each into sectional chambers and adapted to receive and deliver the charge at different parts of the circumference of the apparatus.

3. An apparatus of the class described, comprising a rotary drum divided into circumferential chambers alternately designed to be charged with the matter to be heated and to be traversed by a heating medium and formed with axially extending passages connecting the chambers to be traversed by the heating medium, and means to circulate a heating medium through said chambers for the heating medium, said chambers for the matter to be heated being adapted to receive and deliver the charge at different parts of the circumference of the apparatus.

4. An apparatus of the class described, comprising a rotary drum divided into circumferential chambers alternately designed to be charged with the matter to be heated and to be traversed by a heating medium, and means to circulate a heating medium through said chambers for the heating medium, said chambers for the matter to be heated being circumferentially divided by radial walls each into sectional chambers and adapted to receive and deliver the charge at different parts of the circumference of the apparatus, and said radial walls being formed with passages connecting the chambers for the heating medium.

5. An apparatus of the class described, comprising a rotary drum containing inside transverse partitions fixed to the drum and movable therewith so that the drum is thus divided into circumferential chambers alternately designed to be charged with the matter to be heated and to be traversed by a heating medium, means to circulate a heating medium through said chambers for the heating medium, the chambers for the matter to be heated being open at the circumference of the drum and the chambers for the heating medium being open adjacent the axis thereof, means located at one part of the circumference of the apparatus for forcing the matter to be heated into said chambers for said matter, means to remove the matter at another part of the circumference of the apparatus, and means for supporting the drum so that, during each revolution thereof, the contents of each of the chambers for the matter to be heated will be carried from a relatively high point to a relatively low point.

6. An apparatus of the class described, comprising a rotary drum containing inside transverse partitions fixed to the drum and movable therewith so that the drum is thus divided into annular chambers located one behind the other in the direction of the axis of the drum and alternately open at the inner and outer circumferences, the chambers open at the outer circumference being adapted to be charged with the matter to be heated and to discharge the same at different parts of the circumference of the apparatus, means to pass a heating medium through the axial passage provided internally of said chambers, and means for supporting the drum so that, during each revolution thereof, the contents of each of the chambers for the matter to be heated will be carried from a relatively high point to a relatively low point.

7. An apparatus of the class described, comprising a rotary drum divided into circumferential chambers alternately designed to be charged with the matter to be heated and to be traversed by a heating medium, and means to circulate a heating medium through said chambers for the heating medium, said chambers for the matter to be heated being circumferentially divided each into sectional chambers and adapted to receive and deliver the charge at different parts of the circumference of the apparatus.

8. An apparatus of the class described, comprising a rotary drum divided into circumferential chambers alternately designed to be charged with the matter to be heated and to be traversed by a heating medium and formed with axially extending passages connecting said chambers for the heating medium, stationary plates at the ends of said drum providing chambers with the end faces of the drum communicating through said passages with said chambers for the heating medium, and means to circulate a heating medium through said chambers at the ends of the drum, said passages and said circumferential chambers for the heating medium, said chambers for the matter to be heated being adapted to receive and deliver the charge at different parts of the circumference of the apparatus.

9. An apparatus of the class described, comprising a rotary drum divided into circumferential chambers alternately designed to be charged with the matter to be heated and to be traversed by a heating medium and formed with axially extending passages connecting said chambers for the heating medium, stationary plates at the ends of said drum provided with eccentric tubular inlet and outlet members and providing chambers with the end faces of the drum communicating through said passages with said chambers for the heating medium, and means to circulate a heating medium through said chambers at the ends of the drum, said passages and said circumferential chambers for the heating medium, said chambers for the matter to be heated being adapted to receive and deliver the charge at different parts of the circumference of the apparatus.

10. An apparatus of the class described, comprising a rotary drum containing inside transverse partitions fixed to the drum and movable therewith so that the drum is thus divided into circumferential chambers alternately designed to be charged with the matter to be heated and to be traversed by a heating medium, means to circulate a heating medium through said chambers for the heating medium, the chambers for the matter to be heated being open at the circumference of the drum and the chambers for the heating medium being open adjacent the axis thereof, said chambers for the matter to be heated being adapted to receive and deliver the charge at different parts of the circumference of the apparatus, and means for supporting the drum so that, during each revolution thereof, the contents of each of the chambers for the matter to be heated will be carried from a relatively high point to a relatively low point, and a casing surrounding said drum for collecting the gas or vapor developed from said matter.

In testimony whereof I hereunto affix my signature.

OTTO DOBBELSTEIN.